United States Patent
Hsu et al.

(10) Patent No.: US 7,099,709 B2
(45) Date of Patent: Aug. 29, 2006

(54) METAL ENCLOSURE FOR PORTABLE ELECTRONIC DEVICE

(75) Inventors: Che-Yuan Hsu, Tu-Chen (TW); Yonk Yang, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 568 days.

(21) Appl. No.: 10/097,804

(22) Filed: Mar. 12, 2002

(65) Prior Publication Data

US 2003/0100275 A1 May 29, 2003

(30) Foreign Application Priority Data

Oct. 31, 2001 (TW) ............................... 90218618 U

(51) Int. Cl.
*H04B 1/38* (2006.01)
(52) U.S. Cl. ..................................... 455/575.8; 455/348
(58) Field of Classification Search ................ 455/351, 455/550.1, 575.1, 575.5, 575.8, 117, 217, 455/300, 301, 347, 348, 349, 575.4; 361/736, 361/740, 748, 752, 756, 760, 816, 814, 818; 379/433.01, 433.12, 437, 440, 433.11
See application file for complete search history.

(56) References Cited

U.S. PATENT DOCUMENTS

| 4,602,829 | A | * | 7/1986 | De Andrea ............... 312/223.1 |
| 5,073,978 | A | * | 12/1991 | Mastrippolito .............. 455/346 |
| 5,614,694 | A | * | 3/1997 | Gorenz et al. ............ 174/35 R |
| 5,740,019 | A | * | 4/1998 | Lee ............................. 361/759 |
| 6,049,453 | A | * | 4/2000 | Hulsebosch ................ 361/686 |
| 6,134,121 | A | * | 10/2000 | Braxton ...................... 361/818 |
| 6,341,227 | B1 | * | 1/2002 | Moster et al. ........... 455/550.1 |
| 6,347,218 | B1 | * | 2/2002 | Fuhrmann et al. ........ 455/90.1 |
| 6,480,397 | B1 | * | 11/2002 | Hsu et al. ................... 361/814 |
| 6,809,254 | B1 | * | 10/2004 | Clement et al. ....... 174/35 MS |
| 2002/0137475 | A1 | * | 9/2002 | Shou et al. .................. 455/90 |

FOREIGN PATENT DOCUMENTS

JP 401270417 A * 10/1989
JP 2000049680 A * 2/2000

* cited by examiner

*Primary Examiner*—Nguyen T. Vo
(74) *Attorney, Agent, or Firm*—Wei Te Chung

(57) ABSTRACT

A metal enclosure (5) is provided on a mobile phone. The mobile phone includes the enclosure, a rear cover (4), and an electronic component assembly. The enclosure is formed as a single piece, and comprises a top wall (51), a bottom wall (54), and a periphery wall (53) between the top and bottom walls. The walls cooperatively define an opening (57) at a rear end of the enclosure. The electronic component assembly is received in the enclosure, and the rear cover covers the opening. The mobile phone is thus completed. Because the enclosure has no joints, it is strong enough to withstand considerable shock. In addition, it provides excellent protection from EMI. Furthermore, it has a smooth attractive appearance.

3 Claims, 5 Drawing Sheets

METAL ENCLOSURE FOR PORTABLE ELECTRONIC DEVICE

BACKGROUND OF THE INVENTION

1. Field of the Invention

The present invention relates to enclosures for portable electronic devices, and particularly to a one-piece metal enclosure for a portable electronic device and a method for forming the enclosure.

2. Related Art

With constant development of information technology, portable electronic devices such as mobile phones and personal digital assistants (PDAs) have become very popular. These devices each have an enclosure for accommodating and supporting electronic components therein. The enclosure can be made of plastic material or metallic material. Plastic material has many advantages such as low weight, low cost, ease of manufacture, and corrosion-resistance. However, plastic material is relatively fragile, and does not provide good protection from electromagnetic interference (EMI).

An enclosure made of metallic material is strong and provides superior EMI protection. A conventional metal enclosure comprises a front cover and a rear base that are connected together at mechanical joints. Gaps are defined between the cover and the base, which reduce EMI protection. In addition, the cover and the base are liable to be dislodged from each other when the enclosure is subjected to shock. Furthermore, assembly of the cover and the base is unduly laborious. A conventional metal enclosure is disclosed in U.S. Pat. No. 6,229,993. The enclosure includes a front cover and a rear base which are joined at overlapping portions thereof. A skirt portion around a periphery of the front cover is shaped to receive and overlap a peripheral edge of the rear base, to thereby form the enclosure. However, a small gap still exists between the front cover and the rear base.

An improved enclosure that overcomes the above-mentioned problems of the related art is desired.

SUMMARY OF THE INVENTION

Accordingly, an object of the present invention is to provide a metal enclosure for a portable electronic device which can provide excellent protection from electromagnetic interference (EMI).

Another object of the present invention is to provide a metal enclosure for a portable electronic device, the enclosure being a one-piece component and having a smooth attractive appearance.

A further object of the present invention is to provide a metal enclosure for a portable electronic device, the enclosure being strong enough to withstand considerable shock.

To achieve the above objects, a metal enclosure formed according to the present invention is provided on a mobile phone. The mobile phone includes the enclosure, a rear cover, and an electronic component assembly. The enclosure is formed as a single piece, and comprises a top wall, a bottom wall, and a periphery wall between the top and bottom walls. The walls cooperatively define an opening at a rear end of the enclosure. The electronic component assembly is received in the enclosure, and the rear cover covers the opening. The mobile phone is thus completed. Because the enclosure has no joints, it is strong enough to withstand considerable shock. In addition, it provides excellent protection from EMI. Furthermore, it has a smooth attractive appearance.

Other objects, advantages and novel features of the present invention will be drawn from the following detailed description of a preferred embodiment of the present invention with the attached drawings, in which:

DETAILED DESCRIPTION OF THE INVENTION

Figure 1:
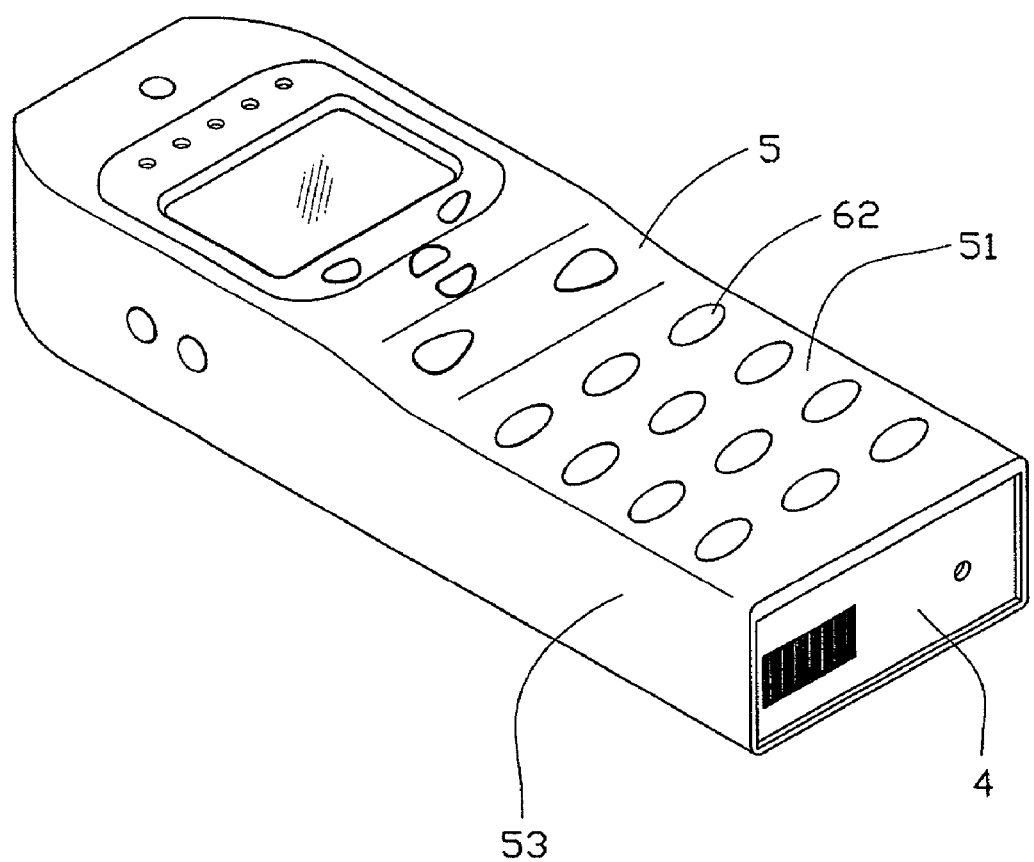
FIG. 1 is a perspective view of a mobile phone incorporating a metal enclosure according to the present invention.

Referring to the drawings, a mobile phone has a metal enclosure 5 formed according to the present invention. The mobile phone includes the enclosure 5, a rear cover 4, and an electronic component assembly. The enclosure 5 is formed as a single piece, and has a top wall 51, a bottom wall 54, and a periphery wall 53 between the top and bottom walls 51, 54. The walls 51, 53, 54 cooperatively define a rear opening 57 at a rear end of the enclosure 5. A rectangular opening 511 is defined in the top wall 51, for receiving a window 71 through which information displayed on a display 7 is visible. A plurality of top holes 512 is defined in the top wall 51 rearwardly of the rectangular opening 511. A plurality of keys 62 is fitted in the top holes 512, for inputting instructions into the mobile phone. The rear cover 4 is made of an elastic metal plate, for covering the rear opening 57. The electronic component assembly includes a U-shaped plastic bracket 9, an electrical circuitry module 8, a plurality of keyblocks 6 on the circuitry module 8, and the display 7 forward of and electrically connecting with the circuitry module 8. The keyblocks 6 are contacted by the keys 62 to input instructions into the mobile phone. The circuitly module 8 is used to process received information, and comprises an upper circuitry module 81 and a lower battery module 82. The bracket 9 comprises a pair of internal rails 91 formed on respective opposite side plates thereof. The rails 91 divide the bracket 9 into an upper space for receiving the upper circuitry module 81, and a lower space for receiving the lower battery module 82. A protrusion (not shown) is formed on a rear portion of a bottom face of a bottom plate of the bracket 9.

Figure 2A:
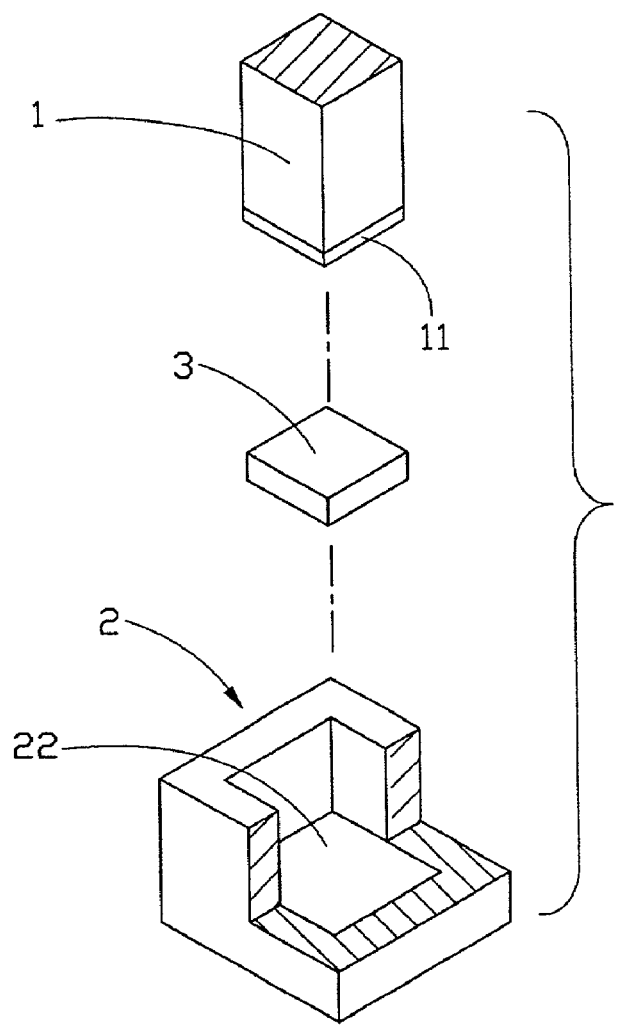
FIG. 2A is a schematic perspective view of a punch for impacting a piece of metal stock ready to be held in a die, with part of the die cut away for clarity.
Figure 2B:
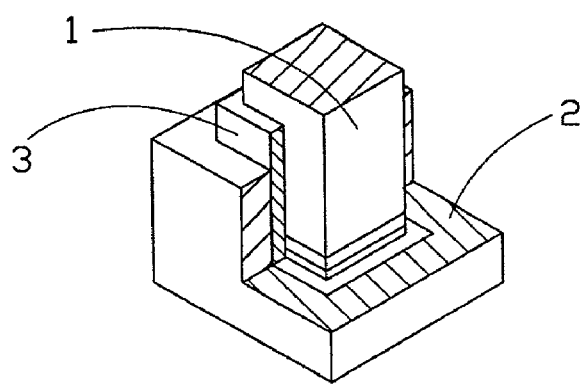
FIG. 2B is similar to FIG. 2A, but showing the piece of metal stock in the die being impacted by the punch to form the metal enclosure according to the present invention by impact extrusion.
Figure 3:
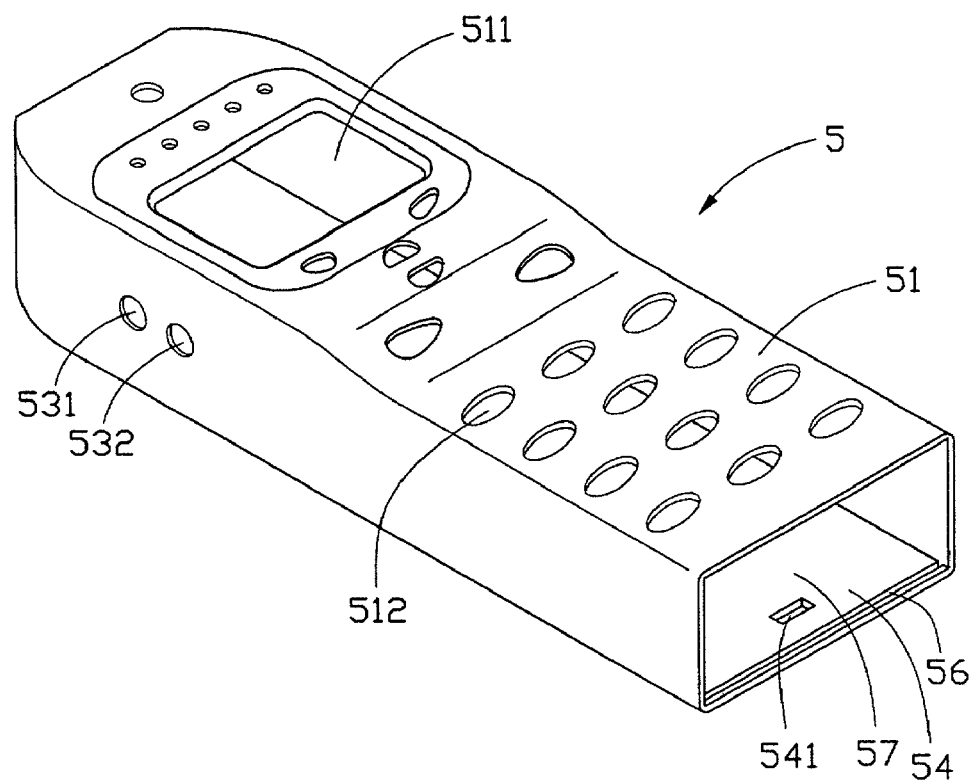
FIG. 3 is a perspective view of the metal enclosure according to the present invention.

FIGS. 2A and 2B show a process of forming the enclosure 5. Firstly, a piece of metal stock 3 is provided. The metal stock 3 is made of ductile metal such as aluminum or aluminum alloy. The metal stock 3 is placed in a die cavity 22 of a die 2. The metal stock 3 has a shape similar to that of the cavity 22, and a size smaller than that of the cavity 22. A space of about 1–3 mm is defined between each side face of the metal stock 3 and a corresponding abutting wall of the die 2. The size of the space corresponds to a thickness of the walls 51, 53, 54 of the enclosure 5. A punch 1 has a stamping head 11. The stamping head 11 has a shape and size substantially the same as the shape and size of the metal stock 3. The punch 1 is repeatedly moved up and down to cause the stamping head 11 to repeatedly impact the metal stock 3. The metal stock 3 is thereby impact extruded such that a portion thereof flows upwardly along the spaces between the die 2 and the punch 1. Accordingly, the enclosure 5 is formed once the said portion of the metal stock 3 has flowed upwardly a sufficient distance. To help the metal stock 3 to flow, the metal stock 3 is heated to and maintained at a temperature of 400–500° C. during the impact extrusion.

The top wall 51 of the enclosure 5 is stamped to define the top holes 512 for the keys 62 and the rectangular opening 511 for the window 71. The periphery wall 53 is stamped with two side holes 531, 532, for accommodating function keys 631, 632. A recess 541 is defined in a rear portion of an inside surface of the bottom wall 54 of the enclosure 5. A transverse groove 56 is defined in the inside surface of the bottom wall 54, between the recess 541 and a rear edge of the bottom wall 54. Finally, surface treatments such as anodization and lacquering are applied to the enclosure 5, to give the enclosure 5 a protective coating and an attractive appearance.

Figure 4:
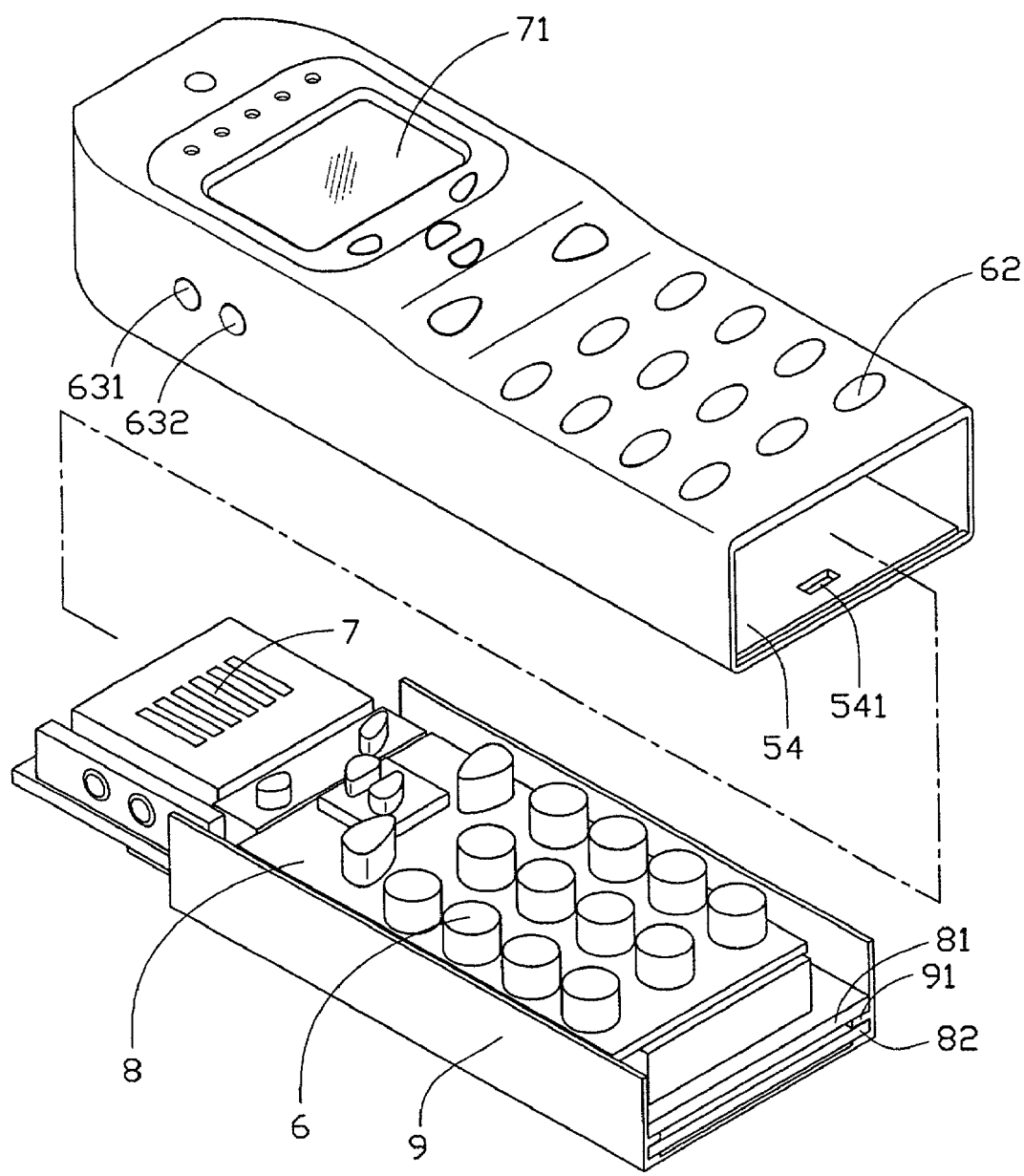
FIG. 4 is an exploded view of FIG. 1, but not showing a rear cover of the mobile phone.

Referring particularly to FIG. 4, in assembly of the mobile phone, the window 71 is fitted in the rectangular opening 511. The keys 62, 631, 632 are respectively located in corresponding top holes 512 and side holes 531, 532. The electronic component assembly is positioned in the bracket 9. The upper space of the bracket 9 receives the upper circuitry module 81, and the lower space of the bracket 9 receives the lower battery module 82. The combined bracket 9 and electronic component assembly is inserted into the enclosure 5 via the rear opening 57. When the combined bracket 9 and electronic component assembly is fully inserted in the enclosure 5, the protrusion (not shown) of the bracket 9 snaps into the recess 541 of the bottom wall 54 of the enclosure 5. The combined bracket 9 and electronic component assembly is thereby fixed in the enclosure 5.

Figure 5:
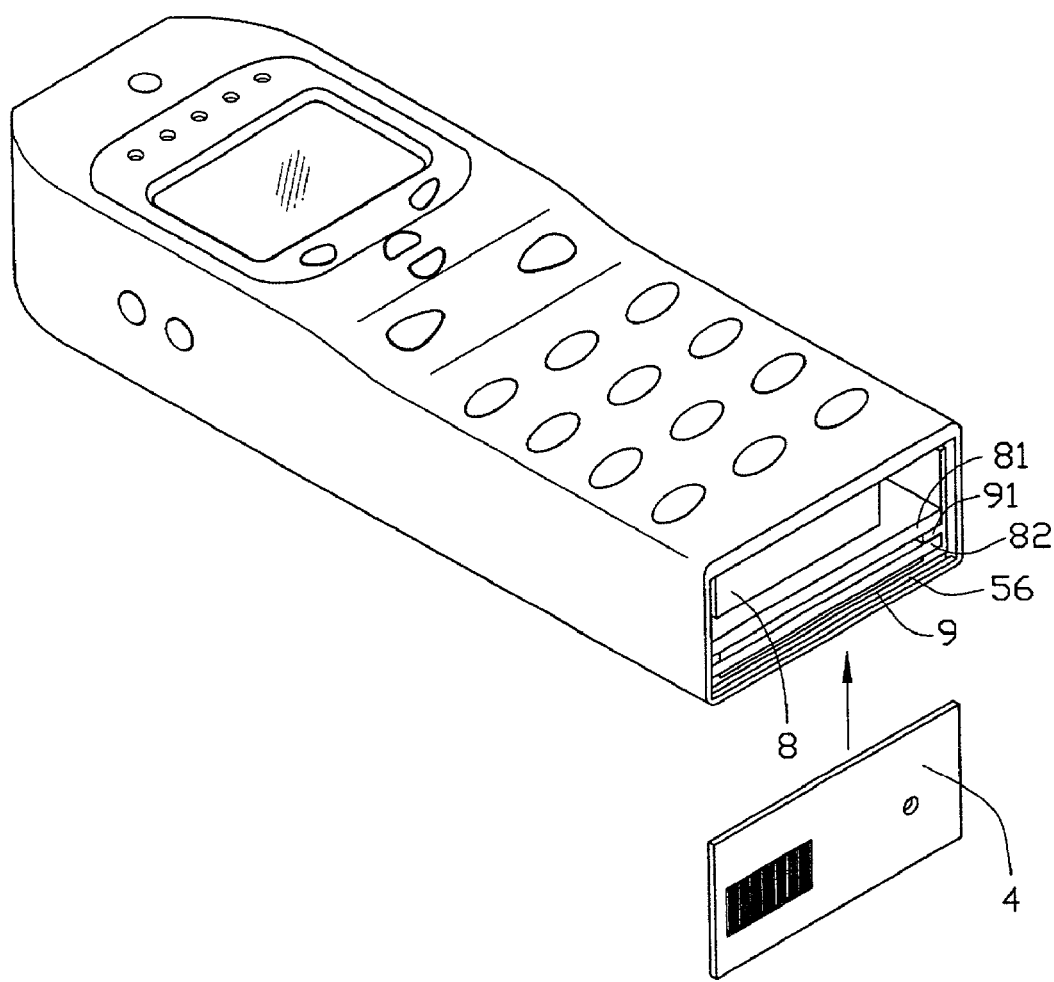
FIG. 5 is an assembled view of FIG. 4, and showing the rear cover ready to be attached to the mobile phone.

Referring particularly to FIG. 5, the rear cover 4 is then attached to the rear of the enclosure 5 at the rear opening 57. A bottom edge of the rear cover 4 is snappingly fitted into the groove 56 of the bottom wall 54 of the enclosure 5. The rear cover 4 thus securely covers the rear opening 57.

In the present invention, the enclosure 5 is a one-piece component. Because the enclosure 5 has no joints, it is strong enough to withstand considerable shock. In addition, it provides excellent protection from EMI. Furthermore, it has a smooth attractive appearance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A portable electronic device, comprising:
    a one-piece metal enclosure integrally comprising a top wall, a bottom wall and a periphery wall between the top and bottom walls, the walls cooperatively defining an opening at an end of the enclosure;
    an electronic component assembly received in the enclosure; and
    a cover covering the opening;
    wherein the enclosure has a groove defined in an inside surface of one of the walls, the groove receiving an edge of the cover, the electronic component assembly is mounted in a U-shaped plastic bracket comprising a bottom plate and two opposite side plates, the bracket comprises a pair of rails to divide the bracket into two spaces respectively receiving a circuitry module located adjacent to the top wall of the enclosure and a battery module.

2. The device of claim 1, wherein the enclosure defines a recess and the bracket has a protrusion snappingly received in the recess thereby fixing the electronic component assembly in the enclosure.

3. A portable electronic device, comprising:
    a one-piece metal enclosure integrally comprising a top wall, a bottom wall and a periphery wall between the top and bottom walls, the walls cooperatively defining an opening at an end of the enclosure;
    an electronic component assembly received in the enclosure; and
    a cover covering the opening;
    wherein the electronic component assembly is mounted in a U-shaped plastic bracket comprising a bottom plate arid two opposite side plates, and the bracket comprises a pair of rails to divide the bracket into two spaces respectively receiving a circuitry module located adjacent to the top wall of the enclosure and a battery module.

\* \* \* \* \*